US009533614B2

(12) United States Patent
Guy et al.

(10) Patent No.: US 9,533,614 B2
(45) Date of Patent: Jan. 3, 2017

(54) VEHICLE COLLISION AVOIDANCE MODIFICATION

(71) Applicant: Lenovo (Singapore) Pte. Ltd., Singapore (SG)

(72) Inventors: Spencer Michael Guy, Raleigh, NC (US); Russell Speight VanBlon, Raleigh, NC (US); Dharma Teja Nukarapu, Morrisville, NC (US); Russell Stuart Gantman, Fuquay Varina, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 197 days.

(21) Appl. No.: 14/461,607

(22) Filed: Aug. 18, 2014

(65) Prior Publication Data

US 2016/0046232 A1    Feb. 18, 2016

(51) Int. Cl.
| | |
|---|---|
| *G08B 21/00* | (2006.01) |
| *B60Q 1/52* | (2006.01) |
| *B60Q 9/00* | (2006.01) |
| *B60R 21/0134* | (2006.01) |

(52) U.S. Cl.
CPC ............. *B60Q 1/525* (2013.01); *B60Q 9/008* (2013.01); *B60R 21/0134* (2013.01)

(58) Field of Classification Search
CPC ....................................... B60Q 1/525
USPC ................... 340/435, 436; 701/301
See application file for complete search history.

(56) References Cited

U.S. PATENT DOCUMENTS

| | | | |
|---|---|---|---|
| 2010/0253598 A1* | 10/2010 | Szczerba ............... | G01S 13/723 345/7 |
| 2014/0118132 A1* | 5/2014 | Braunberger .......... | G08G 1/166 340/435 |

* cited by examiner

*Primary Examiner* — Jeffery Hofsass
(74) *Attorney, Agent, or Firm* — Ference & Associates LLC

(57) ABSTRACT

One embodiment provides a method, including: receiving, via a sensor, data associated with a vehicle operator; determining, using a processor, a view of the vehicle operator based on the received data; associating the view with a characteristic of a collision avoidance system; and thereafter modifying the characteristic of the collision avoidance system. Other embodiments are described and claimed herein.

16 Claims, 4 Drawing Sheets

VEHICLE COLLISION AVOIDANCE MODIFICATION

BACKGROUND

Vehicle collision avoidance systems attempt to provide a vehicle operator (e.g., car driver) with an early warning regarding an impending collision, e.g., with a stationary object or with another moving object. For example, lane change warnings may attempt to notify the driver of a car in the blind spot. Likewise, a collision avoidance system may include warnings issued with respect to stationary objects, e.g., another car or other external object behind the vehicle.

Different types of sensors, e.g., cameras or radar, may be used to detect the external objects. Likewise, more passive "rear view" cameras are sometimes included in passenger cars to permit the driver a view of the area behind a car, e.g., on a console display screen.

BRIEF SUMMARY

In summary, one aspect provides a method, comprising: receiving, via a sensor, data associated with a vehicle operator; determining, using a processor, a view of the vehicle operator based on the received data; associating the view with a characteristic of a collision avoidance system; and thereafter modifying the characteristic of the collision avoidance system.

A further aspect provides a vehicle, comprising: a vehicle body; an operator compartment within the vehicle body; a sensor positioned within the operator compartment; a collision avoidance system including at least one sensor positioned to sense external objects with respect to the vehicle body; a processor; a memory operatively coupled to the processor and storing instructions, the instructions being executable by the processor to: receive, via the sensor positioned within the operator compartment, data associated with a vehicle operator; determine a view of the vehicle operator based on the received data; associate the view with a characteristic of the collision avoidance system; and thereafter modify the characteristic of the collision avoidance system.

Another aspect provides a collision avoidance system, comprising: a processor; and a memory operatively coupled to the processor and storing instructions, the instructions being executable by the processor to: receive, via a sensor, data associated with a vehicle operator; determine, using a processor, a view of the vehicle operator based on the received data; associate the view with a characteristic of a collision avoidance system; and thereafter modify the characteristic of the collision avoidance system.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
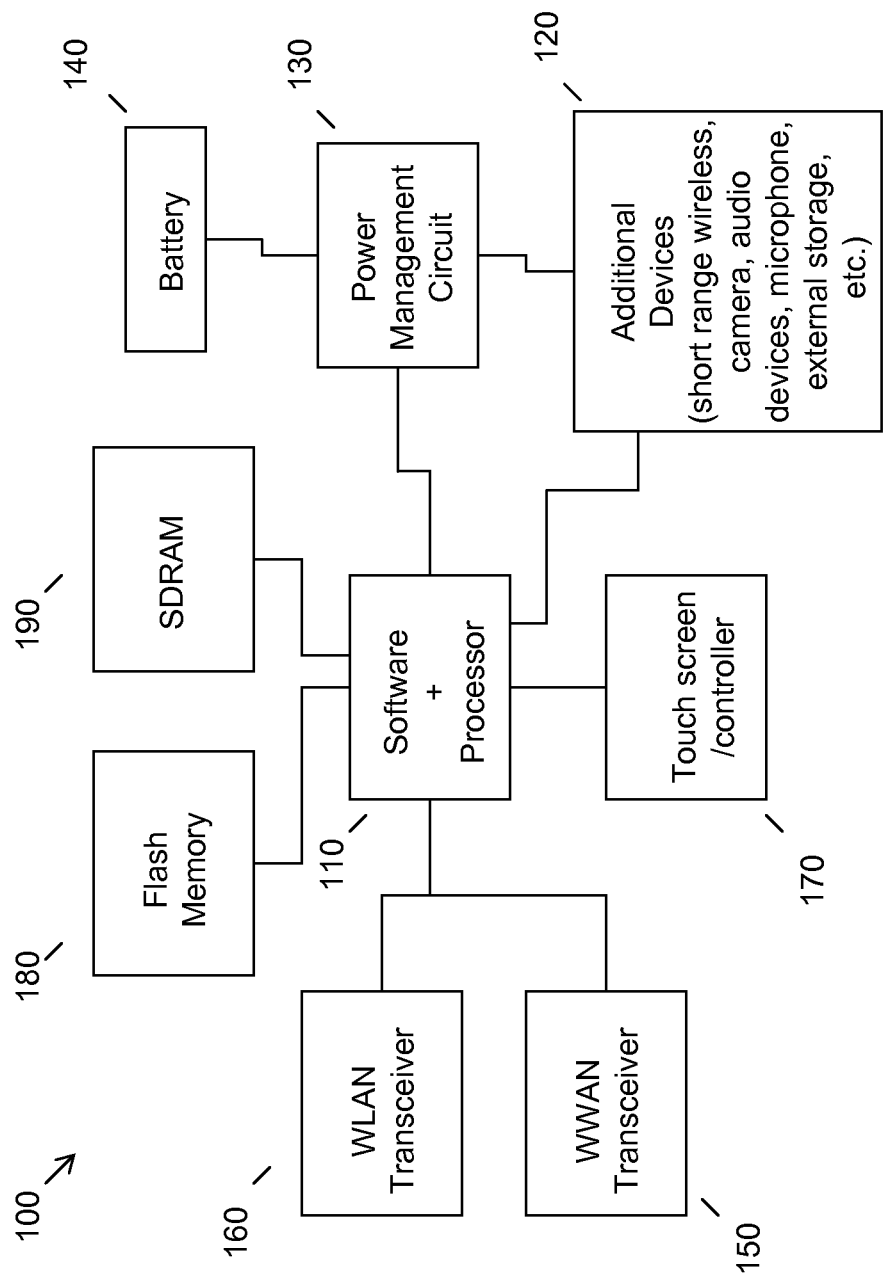
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Vehicle collision avoidance systems can be overly conservative with their warnings, which can be irritating to the point of drivers turning off the warnings completely. As may be understood, this frustrates the purpose of such systems, as user override is not an optimal setting or mode of operation. Collision avoidance systems are sometimes complemented with rear view camera(s) positioned at the rear of the vehicle, but this doesn't solve the fundamental problem of the warnings being too frequent.

Current vehicle collision avoidance technology utilizes sensors to warn the driver when they are too close to an obstacle. These warnings are issued at predetermined distances, and often these warnings are unnecessary when the driver is already aware of a nearby obstacle.

Accordingly, an embodiment permits a vehicle collision avoidance system to be modified in an intelligent fashion. For example, by adding eye tracking camera(s) around the front of the vehicle (e.g., car), an embodiment may adjust the collision avoidance warnings by knowing where the driver is already looking. An embodiment may therefore have smarter warnings, providing a more generous warning range where the driver's not looking in the direction of an obstacle, and likewise providing less cautious or conservative warnings where the driver is already focused in the direction of the obstacle.

Eye tracking makes collision avoidance less invasive, e.g., providing fewer unnecessary warnings, and makes collision avoidance safer, e.g., by identifying driver blind spots and issuing warnings accordingly. Implementations of various embodiments may take a variety of forms, as will become apparent from review of the non-limiting examples provided herein. For example, an embodiment may include lane change assist software that is improved by knowing where the driver is looking to merge, where blind spots might be for a particular vehicle (e.g., given the vehicle's elements such as review and side view mirrors, available sensors, etc.).

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Such a device might be included, for example, within a vehicle and might be used for providing the vehicle collision avoidance modifications, as described herein. For example, circuitry such as outlined in FIG. 1 might be used in a device that plugs into a car console or otherwise connects with an on board computer of a vehicle and thereafter provides sensors, e.g., a camera for capturing image data regarding the driver. Moreover, circuitry such as outlined in FIG. 1 might be used in a device that acts as an on board computer in a vehicle, e.g., providing processing such as processing sensor data and issuing of instructions for modifying a collision avoidance system, issuing alert communications, etc., as further described herein.

Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120), for example a keyboard, camera, microphone, and the like, may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additional devices 120 are commonly included, e.g., such as a camera, microphone, audio output device, or other input/output devices. System 100 often includes a touch screen 170 for data input and display/rendering. System 100 also typically includes various memory devices, for example flash memory 180 and SDRAM 190.

Figure 2:
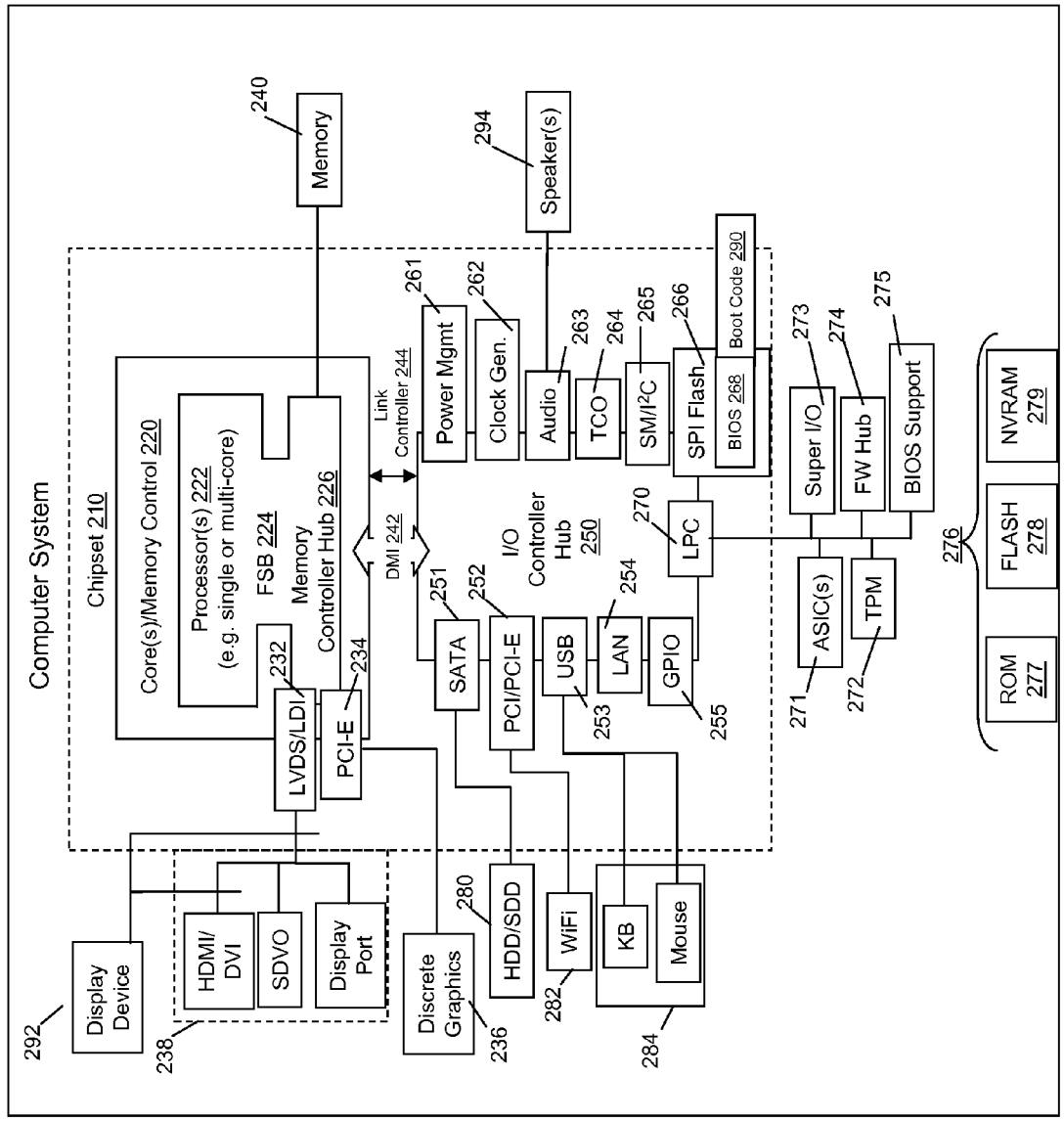
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a LVDS interface 232 for a display device 292 (for example, a flat panel display, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mouse, camera, phone, microphone, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in vehicle collision avoidance systems. By way of example, in addition to the possible implementations described in connection with FIG. 1, the circuitry of FIG. 2 may be included in a vehicle's on board computer. Thus, a device including circuitry such as that found in FIG. 2 might accept sensor data inputs (e.g., regarding detected external objects, driver focus or eye tracking image data) and process the same to modify collision avoidance system alerts, as further described in the following non-limiting examples.

Figure 3:
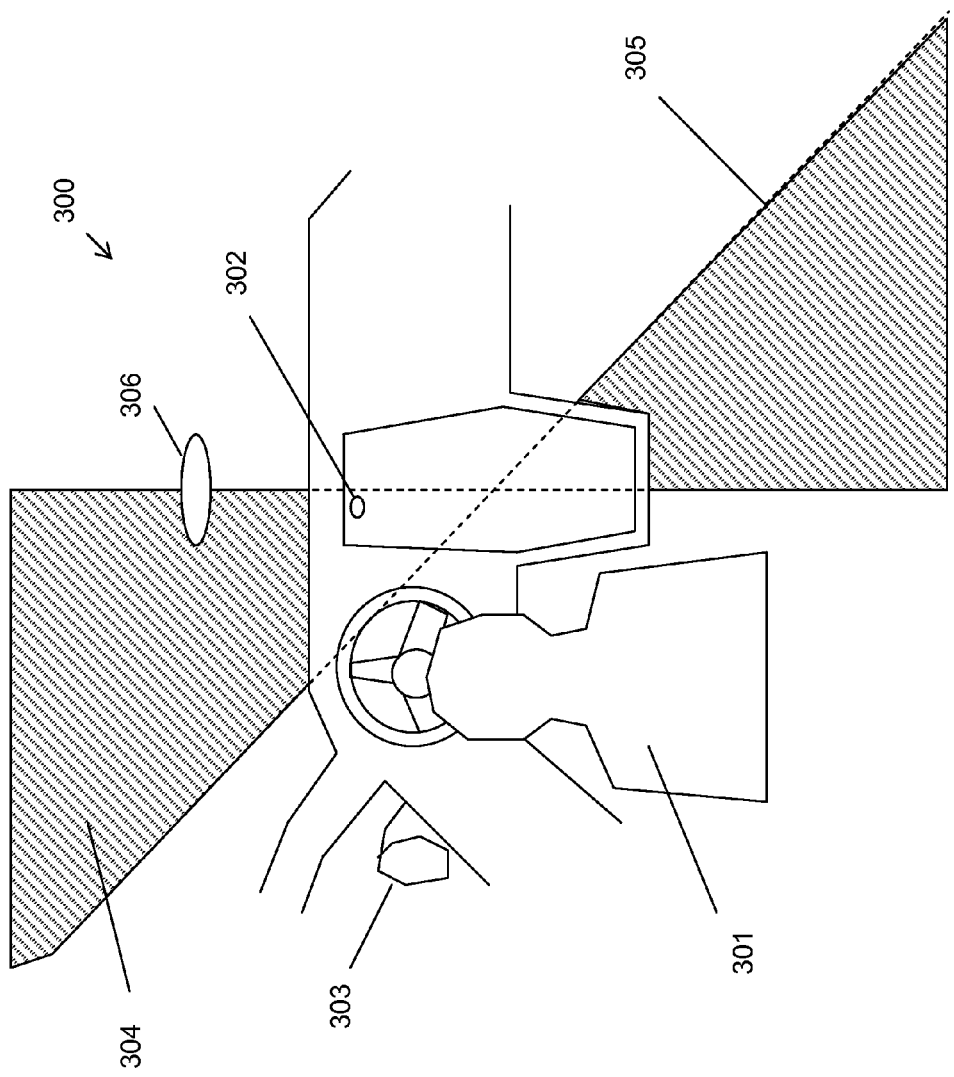
FIG. 3 illustrates an example vehicle and collision avoidance system.

Referring now to FIG. 3, an example vehicle collision avoidance system 300 is illustrated. In FIG. 3, a vehicle operator 301 (e.g., driver of a car) is positioned as usual. The system 300 includes, in an embodiment, a sensor such as a camera 302 that captures images of the driver 301 in the vehicle compartment. The image data is processed in order to determine a field of view of the driver 301, which may be a field of view, a view, or a direction of view of the driver. This information may in turn inform the vehicle collision avoidance system 300 of a characteristic (or set of characteristics) that are to be modified, i.e., based on the driver's current field of view.

For example, a forward facing driver 301 may have a field of view including area 304. In this case, the driver 301 would not have a view of area 305, unless the driver 301 was focusing his or her eyes on the rear view mirror 306. In that case, the driver 301 may well have a view of area 305, but may not be focusing (currently) on area 304, even though forward facing. Thus, the focus of a user's eyes may contain important information that allows a collision avoidance system 300 to modify its characteristic(s) accordingly.

Figure 4:
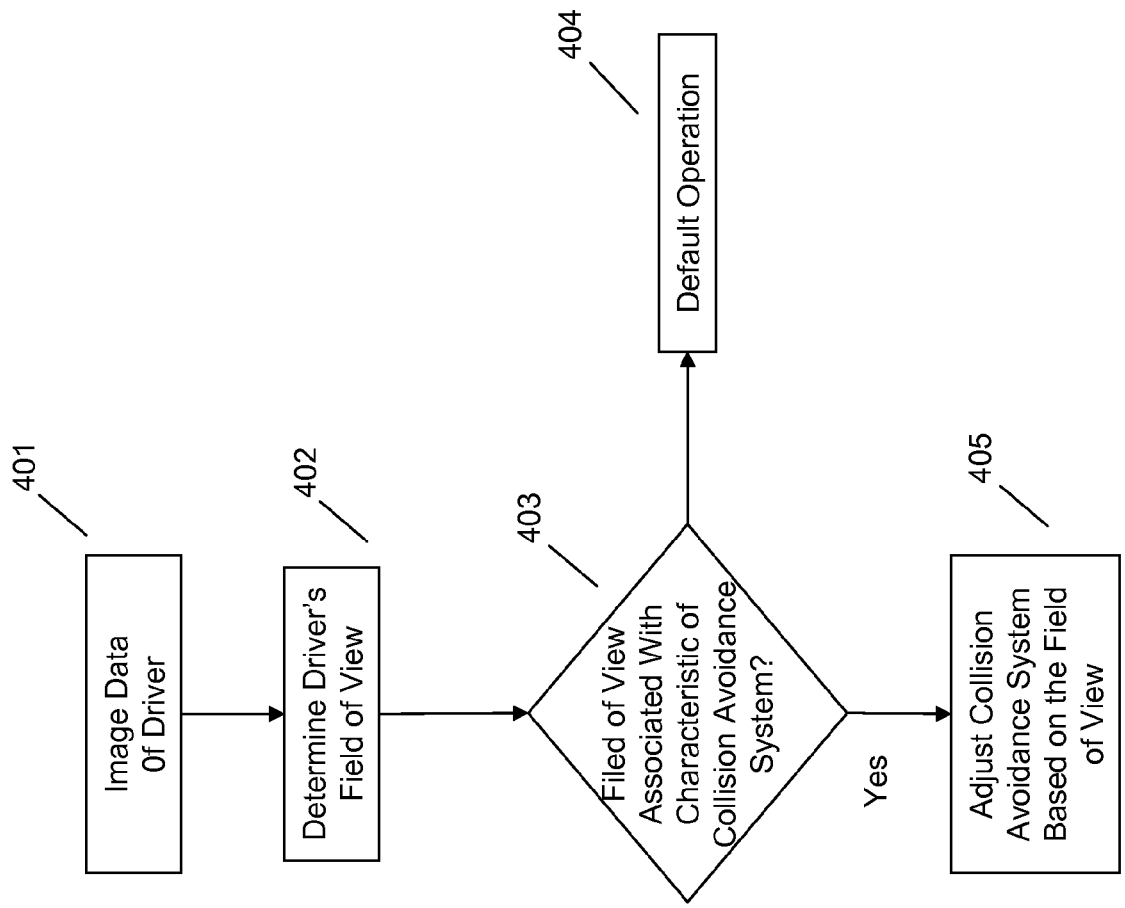
FIG. 4 illustrates an example method for modification of vehicle collision avoidance systems.

By way of example, and referring generally to FIG. 4, an image of a driver is obtained at 401. This may be accomplished for example using a camera, e.g., camera 302 of FIG. 3. This image data may be passed to a gaze tracking sub-system, e.g., implemented in an on-board computer that includes circuitry as outlined in FIG. 1 and/or FIG. 2. The gaze tracking sub-system may process the image data (which may be a collection of images, a single image, video data, etc.) to determine the driver's field of view at 402. For example, the gaze tracking sub-system may take an image of driver 301 and determine that driver 301 is front facing but focusing on or looking at the rear view mirror 306.

As illustrated in FIG. 4, an embodiment may determine that the field of view, e.g., area 305 in the case of a driver determined to be looking at rear view mirror 306, is associated with a characteristic of the collision avoidance system at 403. By this it is meant that the collision avoidance system will have characteristics, e.g., a predetermined distance between the vehicle and an external object (e.g., a parked car located in back of the vehicle) that trips an alarm or alert.

In the current example, the characteristic may be a preset distance of 1 meter between the rear of the vehicle and an adjacent parked car. Thus, if the determination at 403 indicates that the field of view, e.g., of area 305 (as determined by the driver's gaze) and is associated with a rear object collision distance active within the collision avoidance system 300, an embodiment may utilize this determination to modify or adjust the collision avoidance system at 405.

If the driver's field of view is not associated with a characteristic of the vehicle collision avoidance system, i.e., the field of view information does not add to the analysis or otherwise permit adjustment of the characterstic(s), a default functioning of the system may be implemented at 404. By way of example, if the driver's gaze cannot be determined, the collision avoidance system may function in a conventional manner, e.g., using preset distances/alerts that are not adjusted.

As a specific example, for a driver 301 looking into the rear view mirror 306 while operating the car in reverse, the collision avoidance system may be modified by an embodiment to shorten the predetermined distance from 1 meter to 0.5 meters. In this way, an embodiment intelligently adjusts the collision avoidance system based on current or real time information regarding where the driver is looking. Thus, in this example, a driver that is already focusing in the rear view mirror may have the adjacent car in view and wish to continue backing the vehicle up, avoiding the alarm until the adjacent car is closer (in this case, 0.5 meters).

This modification may be maintained (e.g., a predetermined time) or cleared according to various parameters, including user preference. For example, the reduced distance may be maintained until the user looks to a new field of view (e.g., looks away from the rear view mirror to a front field of view, plus an additional time, e.g., 0.1 seconds). Likewise, the reduced distance may be maintained if the user simply adjusts to a similarly relevant field of view, e.g., looking into side view mirror 303. The reduce distance may be maintained until the user clears the setting, e.g., by placing the car in a forward gear or drive.

It should be understood that may such modifications may be implemented, including the opposite of the above example situation. By way of example, in a negative association context, e.g., if the user 301 is instead determined by the gaze tracking system to be looking forward but not in the rear view mirror, e.g., area 304 is the field of view, and the user is backing up, an embodiment may extend the predetermined distance for rearward collision avoidance, e.g., to 2 meters. In this way, an embodiment will provide an alert sooner than usual while the user is backing up, given that the system has determined the user has not appropriately adjusted his or her field of view for a detected external object located to the rear of the vehicle.

As will be appreciated by those having skill in the art, many different scenarios will benefit from implementation of such embodiments. By way of non-limiting examples, lane change assist program may be improved, e.g., in cooperation with image data indicating whether the driver 301 is looking into the side view mirror 303 or rather has a different field of view. Thus, many such vehicle elements (303, 306, etc.) may be included in the analysis, including particular characteristics of each (e.g., a particular field of view may be known for a side view mirror 303 or a rear view mirror 306 of a particular model or type, with a particular angular adjustment, used by a user of a particular height, etc.).

The modifications to the collision avoidance system may take a variety of forms. For example, in addition to adjusting the distances used by the system, other characteristics may be modified. In a non-limiting example, a particular portion of the collision avoidance system associated with a particular context, including driver field of view, may be modified, to the exclusion of other portions. In other words, in a particular scenario (e.g., driver backing up, looking in rear view mirror), one portion of the system may be modified (e.g., rearward collision avoidance) while other portions, e.g., side collision avoidance, may not be modified. Likewise, alerts themselves may be adjusted, such as using different audio or visual alerts with the driver's field of view factored in. This may be appropriate, for example, for a rearward looking driver such that an audible alert is issued rather than a visual alert near the front of the car.

Thus, an embodiment includes a method of modifying a collision avoidance system that includes receiving, via a sensor such as camera 302, data associated with a vehicle operator, e.g., driver 301. In an embodiment, it is determined, e.g., using a processor of a gaze tracking sub-system, a field of view of the vehicle operator based on the received data, which may include taking into account vehicle and/or driver characteristics. In an embodiment, the field of view is associated with a characteristic of the vehicle avoidance system, e.g., rearward field of view associated with a rearward collision avoidance alarm setting. Thereafter, an embodiment modifies the characteristic of the collision avoidance system appropriately given the circumstances detected, for example shortening or lengthening the preset distance for issuing an alert or an alarm, changing the alarm type, etc.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages or machine code. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   receiving, via a sensor, data associated with a vehicle operator;
   determining, using a processor, a view of the vehicle operator based on the received data;
   associating the view with a characteristic of a collision avoidance system;
   using a sensor that detects external objects;
   determining that a detected external object is within the view of the vehicle operator; and
   thereafter modifying the characteristic of the collision avoidance system, wherein the modifying comprises changing a predetermined alert distance set for an external object.

2. The method of claim 1, wherein the modifying comprises modifying a portion of the collision avoidance system associated with the view of the vehicle operator.

3. The method of claim 1, further comprising:
   wherein the modifying comprises reducing a predetermined alert distance set for an external object.

4. The method of claim 1, further comprising:
   wherein the modifying comprises increasing a predetermined alert distance set for an external object.

5. The method of claim 1, wherein the data associated with a vehicle operator is image data.

6. The method of claim 5, wherein the determining a view of the vehicle operator comprises processing the image data to determine vehicle operator direction of view.

7. The method of claim 6, wherein the determining a view of the vehicle operator further comprises associating the vehicle operator direction of view with a particular vehicle element.

8. A vehicle, comprising:
   a vehicle body;
   an operator compartment within the vehicle body;
   a sensor positioned within the operator compartment;
   a collision avoidance system including at least one sensor positioned to sense external objects with respect to the vehicle body;
   a processor;
   a memory operatively coupled to the processor and storing instructions, the instructions being executable by the processor to:
   receive, via the sensor positioned within the operator compartment, data associated with a vehicle operator;

determine a view of the vehicle operator based on the received data;

associate the view with a characteristic of the collision avoidance system;

use the at least one sensor positioned to sense external objects to detect an external object;

determine that the detected external object is within the view of the vehicle operator; and thereafter modify the characteristic of the collision avoidance system, wherein to modify comprises changing a predetermined alert distance set for an external object.

9. The vehicle of claim 8, wherein to modify comprises modifying a portion of the collision avoidance system associated with the view of the vehicle operator.

10. The vehicle of claim 8, wherein the instructions are further executable by the processor to:

wherein to modify comprises reducing a predetermined alert distance set for an external object.

11. The vehicle of claim 8, wherein the instructions are further executable by the processor to:

wherein to modify comprises increasing a predetermined alert distance set for an external object.

12. The vehicle of claim 8, wherein the data associated with a vehicle operator is image data.

13. The vehicle of claim 12, wherein to determine a view of the vehicle operator comprises processing the image data to determine vehicle operator direction of view.

14. The vehicle of claim 13, wherein to determine a view of the vehicle operator further comprises associating the vehicle operator direction of view with a particular vehicle element.

15. The vehicle of claim 8, wherein the sensor positioned within the operator compartment comprises a camera array.

16. A collision avoidance system, comprising:

a processor; and a memory operatively coupled to the processor and storing instructions, the instructions being executable by the processor to:

receive, via a sensor, data associated with a vehicle operator;

determine, using a processor, a view of the vehicle operator based on the received data;

associate the view with a characteristic of a collision avoidance system;

use a sensor that detects external objects;

determine that a detected external object is within the view of the vehicle operator; and thereafter modify the characteristic of the collision avoidance system, wherein the characteristic is modified to change a predetermined alert distance set for an external object.

* * * * *